United States Patent
Carbunar et al.

(10) Patent No.: US 8,073,014 B2
(45) Date of Patent: Dec. 6, 2011

(54) METHOD AND APPARATUS FOR SYNCHRONIZING NODES

(75) Inventors: Bogdan O. Carbunar, Palatine, IL (US); Shivajit Mohapatra, Arlington Heights, IL (US); Michael D. Pearce, Barrington, IL (US); Loren J Rittle, Chicago, IL (US); Venugopal Vasudevan, Palatine, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 124 days.

(21) Appl. No.: 12/395,764

(22) Filed: Mar. 2, 2009

(65) Prior Publication Data

US 2010/0220747 A1  Sep. 2, 2010

(51) Int. Cl.
  *H04J 3/06* (2006.01)
  *H04J 3/08* (2006.01)
  *G08C 17/00* (2006.01)
  *H04B 7/221* (2006.01)
  *H04L 12/28* (2006.01)

(52) U.S. Cl. ........ 370/503; 370/311; 370/324; 370/326; 370/395.42

(58) Field of Classification Search .......... None
See application file for complete search history.

(56) References Cited

U.S. PATENT DOCUMENTS

| | | | |
|---|---|---|---|
| 6,377,608 B1 | 4/2002 | Zyren | |
| 6,501,733 B1 | 12/2002 | Falco et al. | |
| 7,133,373 B2 | 11/2006 | Hester et al. | |
| 2003/0228875 A1 | 12/2003 | Alapuranen | |
| 2004/0160916 A1* | 8/2004 | Vukovic et al. | 370/332 |
| 2005/0243751 A1 | 11/2005 | Yoon et al. | |
| 2006/0140135 A1 | 6/2006 | Bonta et al. | |
| 2007/0174465 A1 | 7/2007 | Huang et al. | |
| 2007/0286136 A1 | 12/2007 | Rittle et al. | |
| 2009/0046611 A1* | 2/2009 | Ryu et al. | 370/311 |
| 2009/0274082 A1* | 11/2009 | Wentink | 370/311 |
| 2009/0323697 A1* | 12/2009 | Celentano et al. | 370/395.42 |

FOREIGN PATENT DOCUMENTS

WO  03019798 A2  3/2003

OTHER PUBLICATIONS

Zheng, et al, "Asynchronous Wakeup for Ad Hoc Networks," Proceedings of the 4th ACM International Symposium on Mobile Ad Hoc Networking & Computing (MobiHoc '03), Annapolis, Maryland, USA, Jun. 1-3, 2003, pp. 35-45.

(Continued)

*Primary Examiner* — Kwang B Yao
*Assistant Examiner* — Jutai Kao (57) ABSTRACT

During each node's awake period, each node multicasts the relative time or slot of their next awake period (beaconing interval) to all neighboring nodes. This enables each node to intelligently and independently schedule the time slot of its next transmission based on the beaconing intervals of the nodes it has heard from. During each active (awake) interval, a node builds statistics of the future transmission/receive times of its neighbors and uses them to determine its next transmission time. In one proposed implementation, at the end of an active interval, a node picks the time slot with the highest counter for its next transmission. In another proposed implementation, at the end of an active interval, a node picks one of the slots with a weighted probability; the weight of each slot is proportional with the value of the counter associated with the slot.

6 Claims, 7 Drawing Sheets

OTHER PUBLICATIONS

Laura Marie Feeney, "A QoS Aware Power Save Protocol for Wireless Ad Hoc Networks," Computer and Network Architectures Lab, Swedish Institute of Computer Science, 1st Annual Mediterranean Ad Hoc Networking Workshop (Med-Hoc-Net), Sep. 2002, Sardegna, Italy, 7 pages.

Yoo Sun Jung: "The International Search Report and the Written Opinion of the International Searching Authority", Korean Intellectual Property Office, Daejeon, Republic of Korea, completed: Aug. 26, 2010, mailed: Sep. 1, 2010, all pages.

* cited by examiner

ALGORITHM 1 GENERIC COUNTING ALGORITHM. THE INVOKED GETSTARTACTIVEINT AND GETSTARTSLEEPINT METHODS PROVIDE THE TIME WHEN THE NEXT ACTIVE OR SLEEP INTERVAL BEGINS. THE METHODS INITSTAT, SETX AND PROCESSPACKETS ARE DEFINED IN THE FOLLOWING IMPLEMENTATIONS OF THIS GENERIC ALGORITHM

1. OBJECT IMPLEMENTATION GENERIC;
2. INQ : INPUTQUEUE;            #PACKET RECV QUEUE
3. PKTLIST : PKT[];             #LIST OF PACKETS
4. $T_X$ : INT;                 #DELTA TIME TO NEXT TRANSMISSION
5. NEXTSENDCPMP : INT;          #NEXT TIME TO SEND CPMPUPDATE
6. $T_{CURR}$ : INT;            #CURRENT TIME
7. NSLOTS : INT;                #NUMBER OF SLOTS PER PERIOD
8. NSLOTS : INT;                #PERIOD LENGTH
9. SLOTLEN : INT;               #DURATION OF A SLOT
10. STATE : INT;                #NODE STATE (ACTIVE OR SLEEP)
11. OPERATION MAIN()
12.    WHILE (TRUE) DO
13.       $T_{CURR}$ := GETCURRENTTIME();
14.       IF ($T_{CURR}$ = GETSTARTACTIVEINT()) THEN
15.          INITSTATE();
16.          STATE : = ACTIVE;
17.       ELSE IF($T_{CURR}$ = GETSTARTSLEEPINT()) THEN
18.          SETX();
19.          STATE :=SLEEP;
20.       ELSE IF(STATE = ACTIVE) THEN
21.          PROCESSPACKETS ($T_{CURR}$);
22.       FI
23.    OD

*FIG. 1*

ALGORITHM 2 FUTURE PEAK DETECTION ALGORITHM. THE METHOD GETALLPACKETS OF THE INPUT QUEUE INQ RETURNS ALL THE PACKETS RECEIVED WITHIN AN INTERVAL OF LENGTH SLOTLEN FROM THE MOMENT OF ITS INVOCATION ($T_{CURR}$).

```
1.  OBJECT IMPLEMENTATION FPD EXTENDS GENERIC;
2.  SLOTCOUNTER : SLOT[NSLOTS];          #PACKET COUNTER VECTOR
3.  MAXC : INT;                           #MAXIMUM NUMBER OF PACKETS PER SLOT

4.  OPERATION INITSTATE()
5.      FOR (I:=0; I<NSLOTS; I++) DO
6.          SLOTCOUNTER[I] := 0
7.      OD
8.      MAXC :=0;
9.  END

10. OPERATION SETTX()
11.     IF (MAXC! = 0) THEN
12.         FOR (I:=0; I<NSLOTS; I++) DO
13.             IF (SLOTCOUNTER[I] = MAXC) THEN WINNERSLOT :=I; FI
14.         OD
15.         IF (WINNERSLOT! = NEXTSENDCPM MOD PERIOD) THEN
16.             $T_X$ := WINNERSLOT;
17.             NEXTSENDCPMP := $T_{CURR}$ + $T_X$;
18.         FI
19.     FI
20. END

21. OPERATION PROCESSPACKETS ($T_{CURR}$ : INT)
22.     PKTLIST := INQ.GETALLPACKETS (SLOTLEN);
23.     FOR (I:=0; I<PKTLIST.SIZE(); I++) DO
24.         INDEX := (($T_{CURR}$ + PKTLIST[I].$T_X$) MOD PERIOD)*(NSLOTS/PERIOD);
25.         SLOTCOUNTER[INDEX] :=SLOTCOUNTER[INDEX]+1;
26.         IF (SLOTCOUNTER[INDEX]>MAXC) THEN MAXC := SLOTCOUNTER[INDEX]; FI
27.     OD
28. END
```

ALGORITHM 3 RANDOMIZED FUTURE PEAK DETECTION ALGORITHM (FPDR)

1. OBJECT IMPLEMENTATION FPDR EXTENDS FPD;
2. TOTAL : INT;                    #NUMBER OF PACKETS RECEIVED
3. RAND : INT;                     #PSEUDO-RANDOM NUMBER GENERATOR

4. OPERATION SETTX()
5.     IF(MAXC!=0) THEN
6.         FOR (I :=0; I<NSLOTS; I++) DO TOTAL+= SLOTCOUNTER[I]; OD
7.         SELECTOR := RAND.NEXTINT() MOD TOTAL+1;
8.         FOR (I :=0; I<NSLOTS; I++) DO
9.             IF (SLOTCOUNTER[I] < SELECTOR) THEN
10.                SELECTOR :=SELECTOR - SLOTCOUNTER[I];
11.            ELSE WINNERSLOT :=I;
12.            FI
13.        OD
14.        IF (WINNERSLOT! = NEXTSENDCPMP MOD PERIOD) THEN
15.            $T_X$ := WINNERSLOT;
16.            NEXTSENDCPMP := $T_{CURR}$ + $T_X$ ;
17.        FI
18.    FI
19. END

METHOD AND APPARATUS FOR SYNCHRONIZING NODES

FIELD OF THE INVENTION

The present invention relates generally to communication systems and in particular, to a method and apparatus for synchronizing nodes within a communication system.

BACKGROUND OF THE INVENTION

Low power consumption, and thus long battery life, is critical to the success of next-generation ad-hoc wireless devices. With this in mind, many ad-hoc networks allow nodes to periodically sleep, or power down, in order to conserve battery life. The period of activity and inactivity is usually referred to as a node's duty cycle (DC).

With the above in mind, it would be beneficial to allow devices to keep their radios off for a majority of the time, yet be aware of the presence and information services being beaconed by neighboring devices. If a radio is off for too long of a time, it may miss information being broadcast by other nodes, however, if a radio is on for long periods of time, it may needlessly listen during periods of inactivity.

When all devices are in the same administrative domain (e.g. same owner or a shared, well-known configuration) with precisely maintained clocks, it is trivial to arrange the nodes' duty cycles to maximize battery life. However, there are many cases where the collection of nodes to be synchronized is not within the same administrative domain. For example, laptop computers and other mobile devices co-resident inside a coffee house while their individual owners make a purchase.

It would thus be beneficial for all nodes, even those without a shared administrative domain, to be synchronized such that they all transmit within a same period of time, so that an efficient duty cycle can be achieved. Therefore, a need exists for a method and apparatus for synchronizing nodes within a communication system that allows nodes to transmit and receive information during a synchronized time period.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE DRAWINGS

In order to alleviate the above-mentioned need, a method and apparatus for synchronizing nodes within a communication system is provided herein. During each node's awake period, each node multicasts the relative time or slot of their next awake period (beaconing interval) to all neighboring nodes. This enables each node to intelligently and independently schedule the time slot of its next transmission based on the beaconing intervals of the nodes it has heard from. During each active (awake) interval, a node builds statistics of the future transmission/receive times of its neighbors and uses them to determine its next transmission time. In one proposed implementation, at the end of an active interval, a node picks the time slot with the highest counter for its next transmission. In another proposed implementation, at the end of an active interval, a node picks one of the slots with a weighted probability; the weight of each slot is proportional with the value of the counter associated with the slot The above technique enables significant power savings of devices in an ad hoc network for applications requiring only periodic content and presence updates from their neighbors. Additionally, due to their distributed and localized nature, the techniques described are very lightweight, introducing only a small, constant transmission overhead.

The present invention encompasses a method for synchronizing a node within a communication system. The method comprises the steps of listening for transmissions from other nodes, determining future transmit times from the transmissions of the other nodes, and storing the future transmit times of the other nodes. The node then chooses a transmit time to utilize as part of a duty cycle based on the future transmit times of the other nodes and broadcasts the chosen transmit time. Finally the node utilizes the chosen transmit time as part of its duty cycle.

The present invention additionally comprises a node comprising a receiver listening for transmissions from other nodes, logic circuitry determining future transmit times from the transmissions of the other nodes and choosing a transmit time to utilize as part of a duty cycle based on the future transmit times of the other nodes, a database storing the future transmit times of the other nodes, and a transmitter broadcasting the future transmit time.

Prior to describing node synchronization, the following definitions are provided to set the necessary background for utilization of the present invention.

A node can be either in an active or in a sleep mode, depending on the status of the node's wireless network interface. The succession of active and sleep intervals is called the duty cycle of the node.

Each active or sleep interval is further divided into smaller intervals, called slots.

Cluster of synchronization is a sub-set of nodes that transmit at a similar time.

A network is said to be in a stable state of synchronization, if nodes no longer move from one cluster of synchronization to another.

A network is said to be synchronized if it has reached a stable state with a single cluster of synchronization.

A network is said to be spatially partitioned if it lacks even the possibility of communication paths or reliable communication paths to become synchronized.

A network is said to be temporally partitioned if reliable communication paths would exist if the nodes of the network were otherwise synchronized.

Packet loss rate is the number of packets which were not received over a real channel divided by the number of packets which were transmitted and could be received over a perfect channel. The packet loss rate metric idealizes all other randomized real channel issues. It is assumed that no systematic real channel issues are present (i.e. we assume a reasonable MAC layer implementation of the broadcast primitive even in light of both a fluctuating and a non-instantaneously deterministic node density).

Active or Awake Interval is a time period where a node is not sleeping, and is either actively transmitting, or listening.

The technique for synchronization consists of a first initialization stage and the second is the synchronization stage. When a node starts up it enters the initialization phase and then enters the synchronization stage. The node remains in the synchronization stage until it is turned off.

During the initialization phase, a node decides its duty cycle. Each node has a duty cycle consisting of sleep and active intervals. Note that we do not restrict the number of consecutive sleep or active intervals in one duty cycle. However, as will become clear later, it is useless to have more than a single listen interval in a duty cycle. During its initiation period, each node transmits information consisting of context and presence data, along with the time of its next transmission, relative to the current time.

A node then enters the synchronization phase at the beginning of its first active/awake interval. A node that has entered the synchronization stage sends its first update (presence information along with a transmission time) at the end of its first active interval. From then on, a node sends its updates at the end of each active interval. During each active interval, a node collects all updates (containing transmission times) received from its neighbors. At the end of the active interval, a node uses the relative transmission times contained in the updates in order to build statistics of the most popular times for the next transmissions. It then uses these statistics in order to decide a time of its next transmission. This is equivalent to deciding a subset of its neighbors with which to synchronize. Since the duration of sleep and active intervals coincides, in case of no packet losses, a node is guaranteed to receive an update from each of its neighbors during each of its active intervals.

It should be noted that collisions (i.e. multiple transmissions at exactly the same time) are a MAC layer problem, since the MAC layer is responsible for media access. The above-describe technique does not synchronize to such a fine granularity that any two nodes will literally be trying to transmit at the same instant. It is the intent to schedule transmissions during the 1-second (or so) window during which the most nodes will be transmitting. By clumping the traffic up like this, there is a small increase in collision probability, but with a channel is running at several tens of megabits per second, collisions are generally not an issue since each packet will be taking less than 1 millisecond to transmit.

In alternate embodiments of the present invention techniques to mitigate collisions may be employed. For example, a small amount of randomness to each node's transmission time may be implemented. In essence, the idea is to randomly pick which millisecond (within the 1-second synchronized "bin") to actually transmit on. Thus, all nodes are synchronized to a 1-second bin and have their transmissions uniformly distributed within that bin. This will reduce the instantaneous load on the network. To make this work, radios will have to be turned on a little earlier than the "target" time, since the node clocks aren't synchronized.

It should also be noted that nodes listen for transmissions the entire awake period. However, many radios cannot listen and transmit simultaneously. Thus, many radios are going to be deaf during their actual transmission. These radios usually employ a MAC algorithm that performs "listen before talk" so that they increase the probability that they will not miss transmissions by other nodes.

Figure 1:
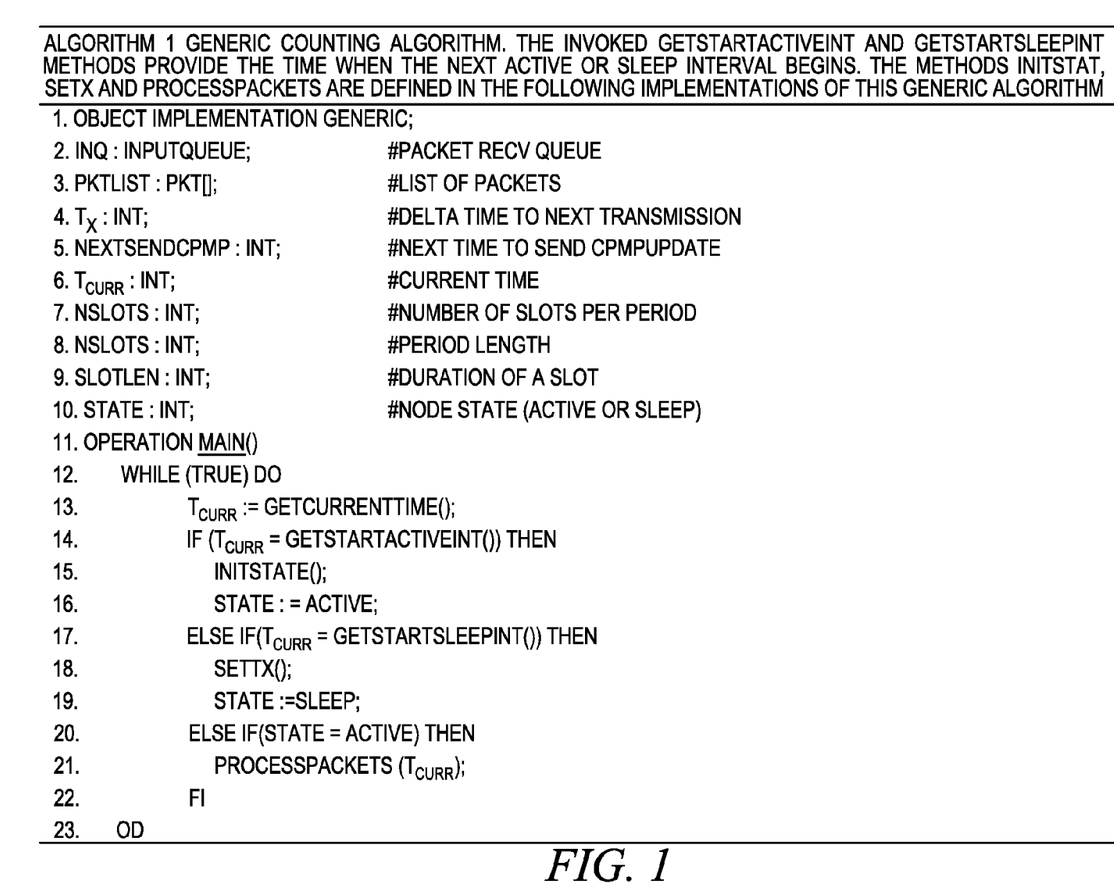
FIG. 1 shows the pseudo-code of the implementation for a single node in the network.

Counting Algorithms:

We first describe an implementation of a generic counting algorithm, on which we later build all counting algorithms. FIG. 1 shows the pseudo-code of the implementation for a single node in the network. A node can be either in an ACTIVE or a SLEEP state, corresponding to the node's duty cycle intervals. Each active or sleep interval has a number of slots, nSlots, each of duration slotLen.

The generic algorithm operates in the following manner. If the node is at the beginning of its active interval (line 13) it calls the initStat method to initialize its counting structures (line 14) and switches its state to ACTIVE. If the active interval has just completed and the node enters its sleep interval (line 16) it calls the setTX method to process the counting structures and decide the future transmission interval (line 17) and switches to a SLEEP state (line 18). If none of these conditions is satisfied, but the node is in an ACTIVE state (line 19) then the algorithm calls the method processPackets in order to retrieve all the packets received in the interval and update its counting structures (line 20).

Future Peak Detection (FPD):

The idea behind FPD is the following: During an active interval, a node N receives packets from all its neighbors (unless some are lost due to transmission noise). Each packet contains a TX value, announcing the time of the packet's sender next transmission (current time+TX value). At the end of its active interval, the node N uses the TX values of the packets received in order to compute the future transmission times of its neighbors. Moreover, it builds statistics of these values, looking for the point in the future that will be used by most of its neighbors for their transmissions. N then chooses that point in time for its future transmission, effectively synchronizing with the subset of its neighbors that send at that time. In case of ties, N chooses the earliest time for its transmission.

Figure 2:
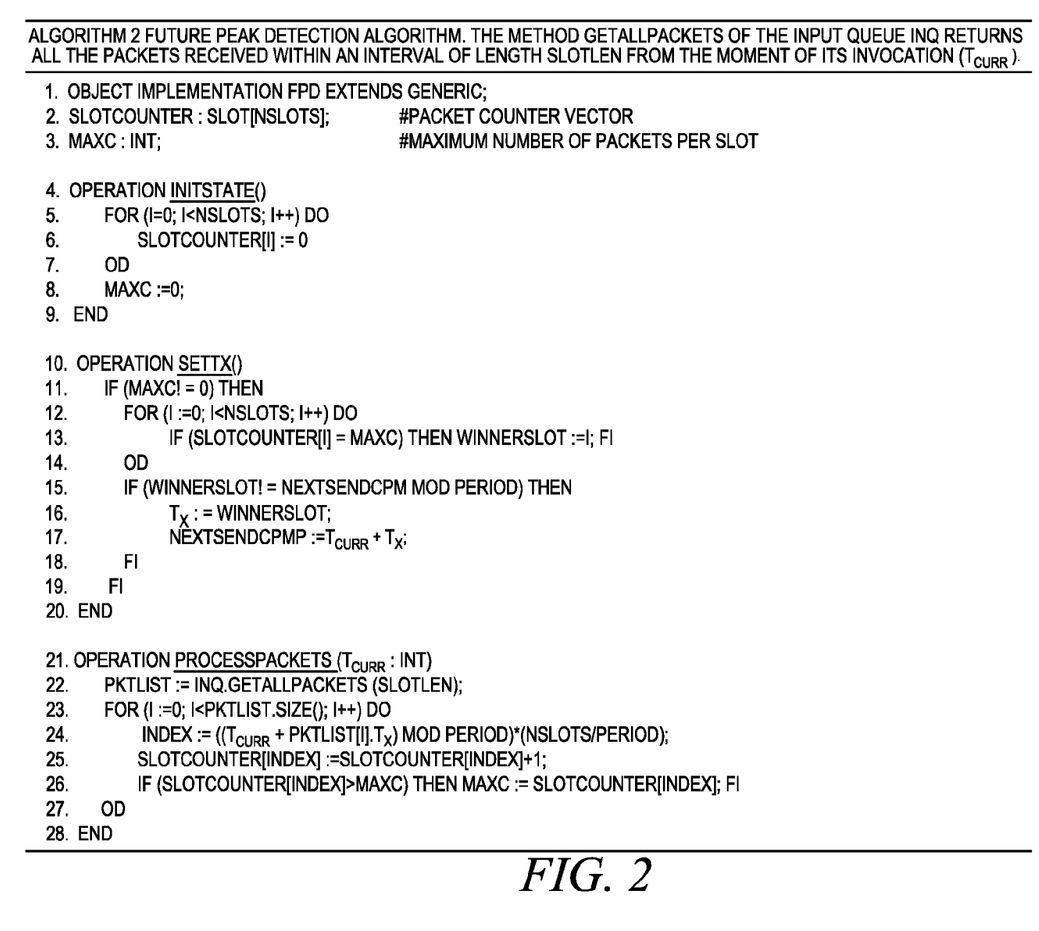
FIG. 2 shows the pseudo-code for performing future peak detection.

An algorithm for performing FPD is illustrated in FIG. 2. Using the algorithm of FIG. 2, each node maintains a list of buckets, slotCounter, one for each slot in an interval. Each bucket stores information (a counter) for the packets received by the node from its neighbors. That is, each bucket counts the number of packets that will be sent by the node's neighbors in the corresponding slot, the next time they will send a packet. Each node also maintains an indicator for the maximum counter among the nSlot buckets in the slotCounter array, denoted maxC.

The initState method (lines 4-9) resets the counter of each bucket in slotCounter and also the maxC value. The process- Packets method (lines 21-27) uses the network interface's input queue inQ to retrieve all the packets received at a given time (line 22). For each such packet, sent by a neighbor A, the node computes the next transmission time as promised by the TX field of the packet (the current time plus the TX value) and uses it to compute the index of the slot corresponding to that future time (line 24). It then increments the counter associated with bucket of that slot (line 25) and updates the maxC value (line 26).

At the end of the active interval, the setTX method (lines 10-20) finds the first slot whose bucket has a counter that equals the maximum seen during the active interval, maxC. If the index of that slot, winnerSlot, is different from the index of the slot corresponding to its own next transmission time, nextSendCPMP mod nSlots (line 15), the node synchronizes with the neighbors transmitting in this slot, winnerSlot. That is, its sets its TX value to the winnerSlot value (line 16) and correspondingly updates the time of its next transmission (line 17).

Figure 3:
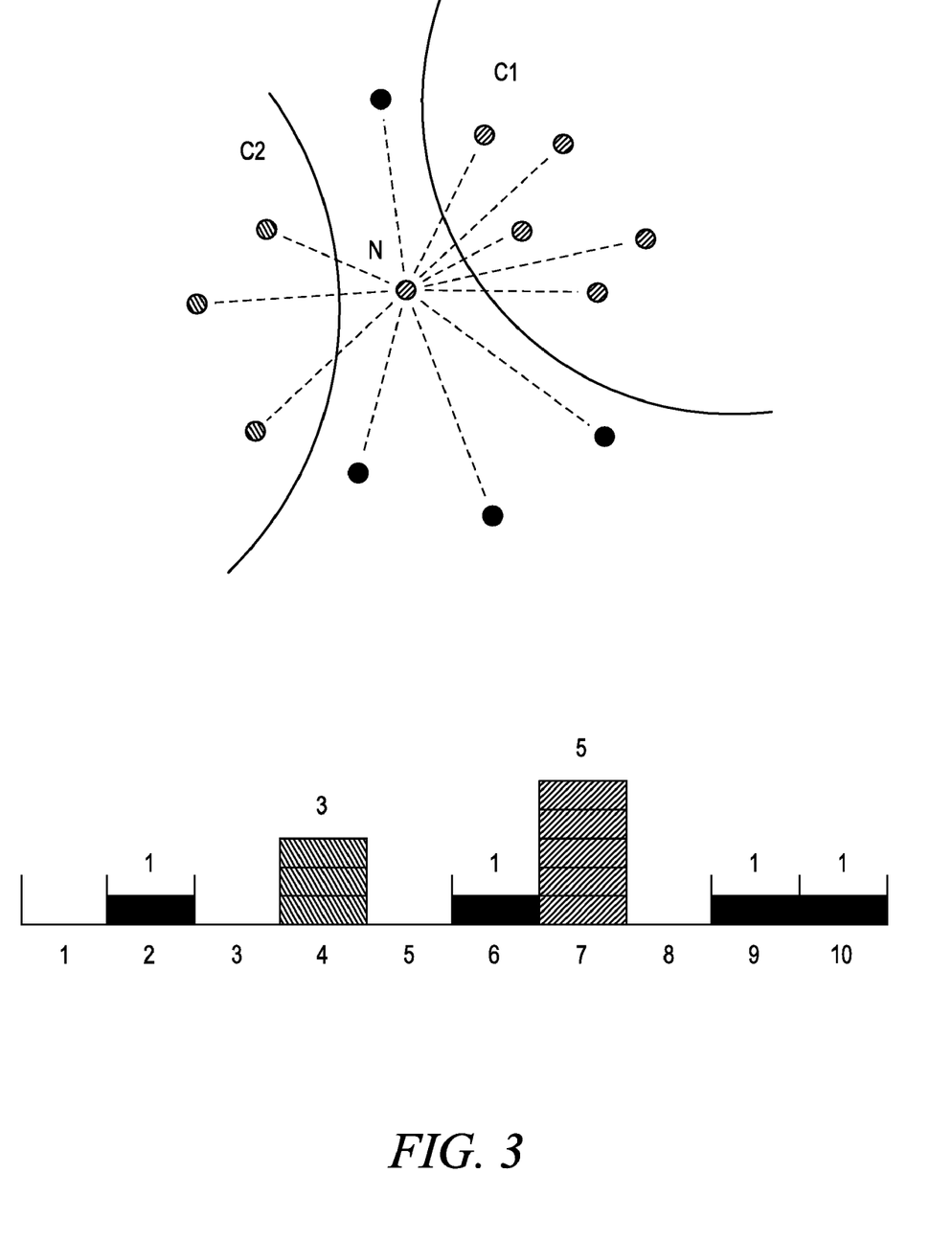
FIG. 3 illustrates future peak detection.

Future peak detection within a communication system is illustrated in FIG. 3, where node N receives packets from 12 neighbors. A group of 5, a group of 3, and 4 groups of 1 (single) neighbors are formed based on their future transmission times as advertised in the packets received by node N. Node N chooses for its transmission the slot containing the group of 5 packets (the blue neighbors). We emphasize the fact that each node performs this operation during each of its active intervals, even after the node is synchronized with all its neighbors. This enables a node to handle new neighbors (including node mobility scenarios).

Figure 4:
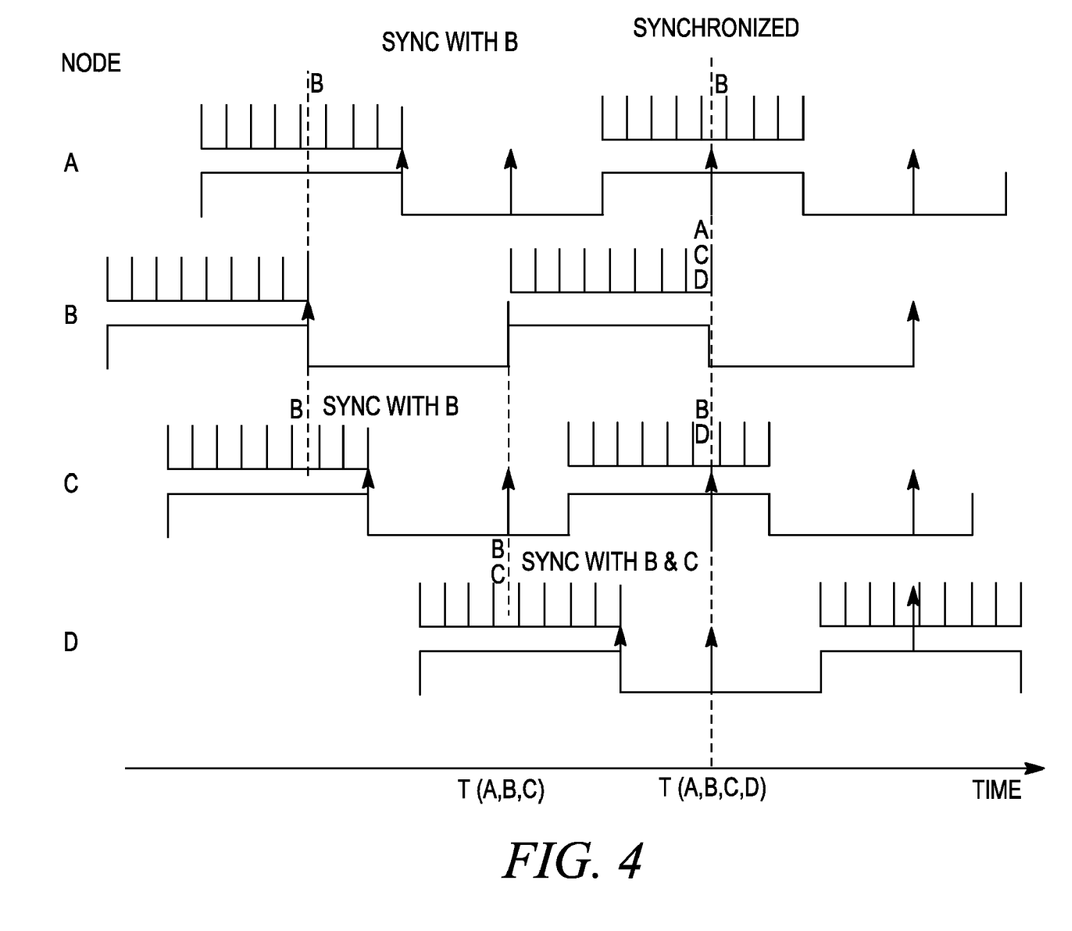
FIG. 4 shows a possible outcome of the FPD algorithm for the network illustrated in FIG. 3.

FIG. 4 shows a possible outcome of the FPD algorithm for the network illustrated in FIG. 3. When a node starts up it enters an active interval. The duty cycle of each node consists of an active interval followed by a sleep interval. At the completion of each active or sleep interval, a node sends a broadcast packet advertising its next transmission (TX value). The length of the active and sleep intervals is equal among all the nodes. In this example, the node B is the first to start and later to send a packet. The packet, received by both A and C (D is not yet active) forces both nodes to synchronize with B. The first synchronized transmission of A, B and C takes place at time T(A,B,C). Later, when active, node D receives two packets, one from B and one from C, that fall in the same slot. D synchronizes then with B and C and the first synchronized transmission of the entire network takes place during the next interval (T(A,B,C,D)).

Figure 5:
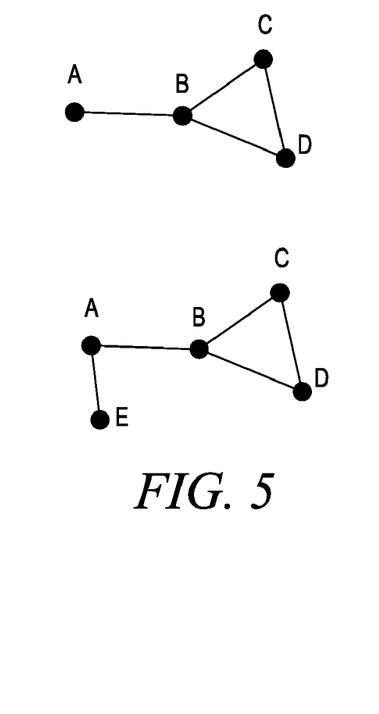
FIG. 5 illustrates an example network.

The FPD algorithm has the problem that it may not synchronize the entire network. Using the example network of FIG. 5, consider a scenario where nodes A, B, E, C and D start up in this order. First, nodes C and D form a cluster of synchronization and nodes A, B and E form another one. However, when later B receives packets from C and D falling into the same slot, different from the slot on which the packet from A falls, B will leave its cluster and join the cluster of C and D. From then on, the clusters of A and E and of B, C and D will send during different time slots and will never synchronize with each other.

Experiments with imperfect channel conditions have shown that FPD can eventually synchronize these networks. The intuition behind this seemingly unexpected result is that when packets are lost, a node in a cluster of synchronization C1 may at one point receive more packets from neighbors in another cluster C2 than from neighbors in its cluster C1. This will make the node migrate to the cluster C2 and in time, it may drag more of the members of C1 into C2, until C1 is completely merged into C2.

As imperfect channel conditions are the real-world situation (especially when using the broadcast primitives of IEEE 802.11 or 802.15.4), the above-technique will likely not need to be modified to obtain synchronization results of FPD in practice. However, these findings can be exploited in order to build an extension of the FPD algorithm that synchronizes all the nodes in a large network much faster and "even" in the presence of perfect channel conditions. More particularly, a randomized version of the FPD algorithm (FPDR) is implemented as follows:

FPDR:

While FPD requires a node to always synchronize with the time slot which most of its neighbors will use for their next transmission, FPDR will require a node to choose this slot only with a certain probability. The probability is weighted among all the packets received in an active interval. For instance, using the example shown in FIG. 5, node N will choose the 7th slot (chosen by 5 of its neighbors) for its transmission with probability 5/12 and the 4th slot (chosen by 3 of its neighbors) only with probability 3/12. However, this process will at one point migrate the node N from the blue cluster C1 to the red cluster C2, or even to one of the black clusters.

Figure 6:
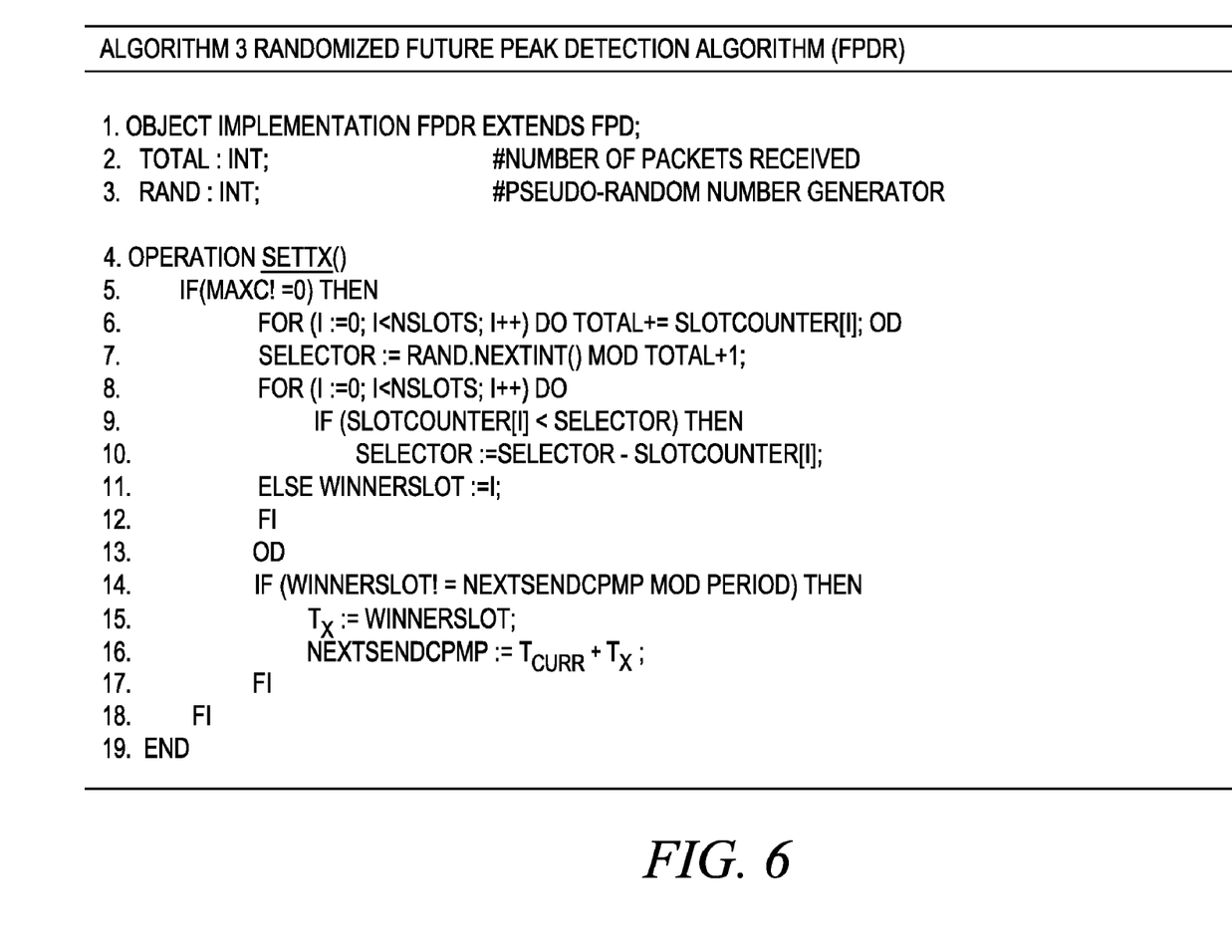
FIG. 6 shows an algorithm for performing FPDR.

FIG. 6 shows an algorithm for performing FPDR. The FPDR algorithm is an extension of the FPD algorithm, thus only the differences are shown. For instance, FPDR inherits the variables defined by the GENERIC and FPD algorithms and also leave the initState and processPackets methods unchanged. The FPDR algorithm only overwrites the setTX method. That is, after the bucket list slotCounter corresponding to the current active interval has been generated, the FPDR algorithm requires nodes to choose the winner slot in a weighted probabilistic fashion. That is, a node counts the number of packets received in the active interval (variable total line 6) and uses it to generate a random number, selector in the interval [1,total]. The node then uses the selector variable to choose the winner slot in a weighted probabilistic fashion, where the weight is proportional to the counter of the slot's bucket and inversely proportional to the total number of packets (lines 8-13). The algorithm then proceeds just as FPD, to set the node's internal variables based on the winner slot (lines 14-17).

Figure 7:
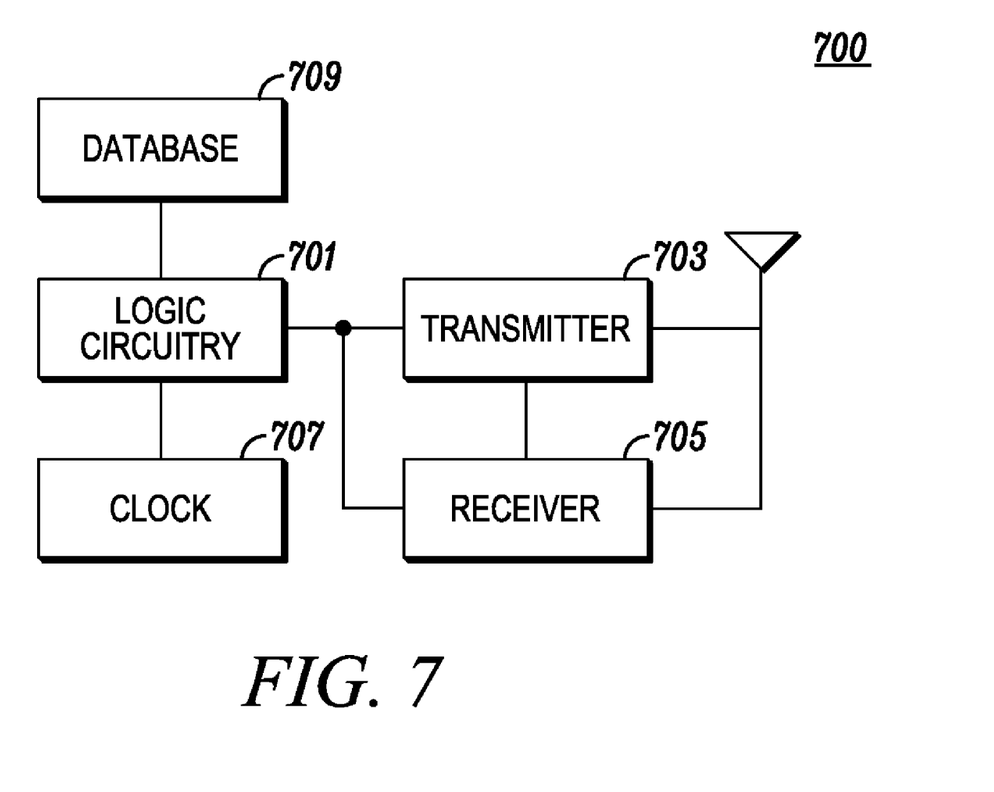
FIG. 7 shows a block diagram of a single node in the network.

FIG. 7 is a block diagram of node 700. As shown, node 700 comprises transmitter 703 and receiver 705, in turn, coupled to logic circuitry 701. Database 709 is provided to store slot transmit times for various nodes. Clock 707 serves as timing means to properly time synchronize node 700 to the correct system time. Although various forms for node 700 are envisioned, in a preferred embodiment of the present invention node 700 is formed from a Marvell 8385 transceiver (transmitter 704 and receiver 705) coupled to a Intel xScale processor 701. In an alternate embodiment of the present invention node 700 is formed from a Freescale Inc. MC13192 transceiver (transmitter 704 and receiver 705) coupled to a Motorola HC08 8-bit processor 701.

Figure 8:
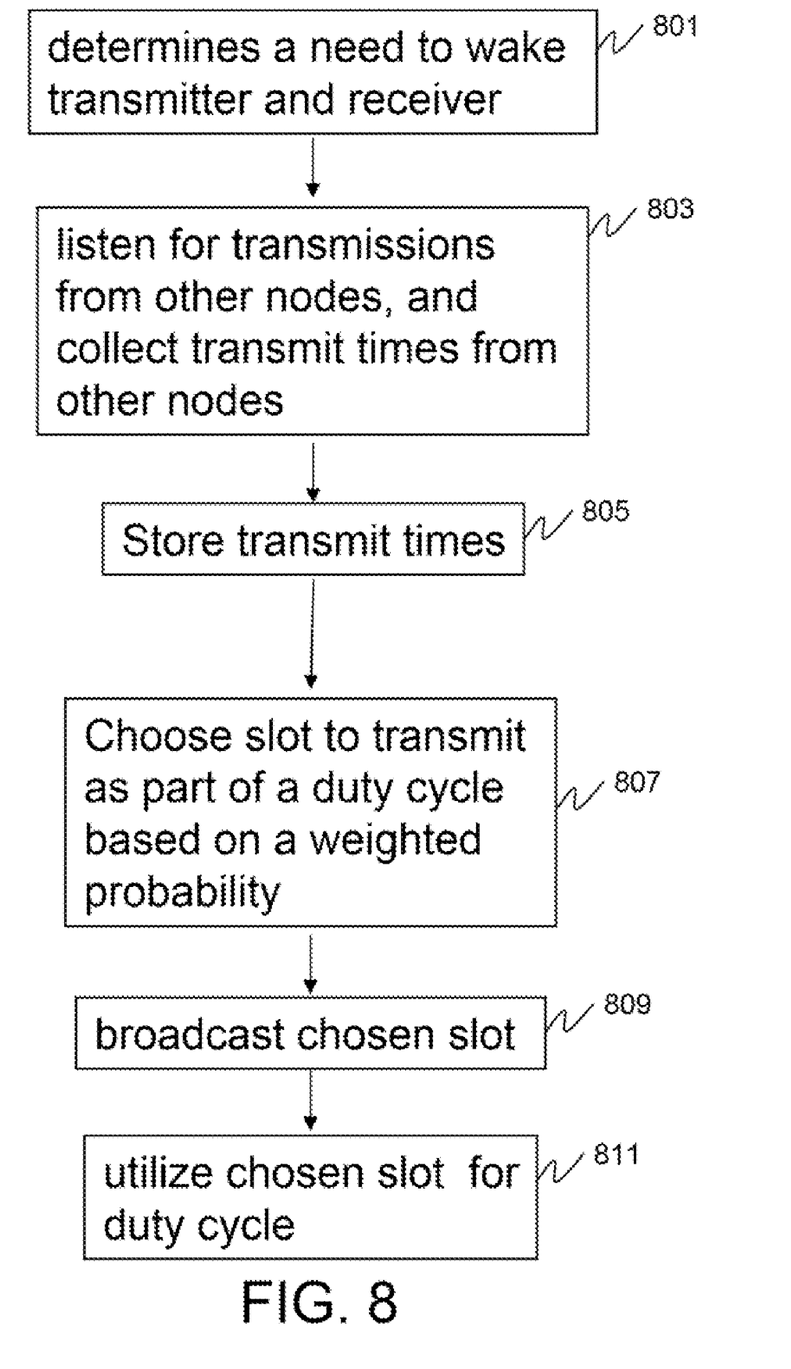
FIG. 8 shows a flow chart of the operation of a single node in the network.

FIG. 8 is a flow chart showing operation of node 700 during a synchronization stage. The logic flow begins at step 801 where logic circuitry 701 accesses clock 707 and determines it needs to awaken transmitter 703 and receiver 705 as part of its duty cycle. Once awake, the logic flow continues to step 803 where logic circuitry 701 instructs receiver 705 to listen for transmissions (beacons) from other nodes, and to collect/determine future transmit times (e.g. future slots used for transmissions) from the transmissions of the other nodes. These future transmit times are then stored in database 709 (step 805).

At step 807, a determination is made by logic circuitry 701 as to when to transmit as part of a duty cycle (e.g., what future slot to transmit). This determination is made based on the future transmit times of the other nodes. As discussed above, two approaches may be utilized to make this determination. In a first approach, logic circuitry 701 determines to transmit and receive during a time/slot utilized by the most nodes.

In a second approach, the future transmit times are grouped into bins. The bins are mathematically weighted so that there exists a certain probability of selecting each bin. More particularly, the more transmissions that exist within a bin, the higher its weight, so that the probability will be greater for picking a bin with more node transmissions. Logic circuitry then chooses the transmit time to utilize as part of the duty cycle based on a weighted probability of each bin.

As is evident, with the second approach there exists a distinct possibility that any bin's time may be chosen for transmission and reception, even those bins having a least number of nodes.

At step 809 logic circuitry 701 instructs transmitter 703 to broadcast its chosen transmit time, and the logic flow continues to step 811 where the transmit time is utilized as part of a duty cycle.

While the technique for synchronization has been particularly shown and described with reference to a particular embodiment, it will be understood by those skilled in the art that various changes in form and details may be made therein without departing from the spirit and scope of the technique for synchronization. It is intended that such changes come within the scope of the following claims:

The invention claimed is:

1. A method for synchronizing a node within a communication system, the method comprising the steps of:
   a node listening for transmissions from other nodes;
   the node determining future transmit times from the transmissions of the other nodes;
   the node storing future transmit times of the other nodes;
   the node choosing a transmit time to utilize as part of an active duty cycle based on the future transmit times of the other nodes;
   the node broadcasting the chosen transmit time; and
   the node utilizing the chosen transmit time as part of its active duty cycle;
   wherein the step of choosing the transmit time to utilize as part of the active duty cycle comprises the step of choosing a future transmit time most utilized by the other nodes;
   wherein the step of choosing the transmit time to utilize as part of the active duty cycle comprises the steps of:
   grouping the future transmit times into bins of future transmit times;
   mathematically weighting each bin; and
   choosing the transmit time to utilize as part of the active duty cycle based on a weighted probability of each bin.

2. The method of claim 1 wherein the step of listening for transmissions from the other nodes comprises the step of listening for beacons from other nodes broadcast during their future transmit times as part of their active duty cycle.

3. The method of claim 1 wherein the transmit time to utilize as part of the active duty cycle comprises a time slot to utilize as part of the duty cycle.

4. The method of claim 1, wherein the transmit time to utilize as part of the active duty cycle comprises a time slot to utilize as part of the duty cycle.

5. A node comprising:
   a receiver listening for transmissions from other nodes;
   logic circuitry determining future transmit times from the transmissions of the other nodes and choosing a transmit time to utilize as part of an active duty cycle based on future transmit times of the other nodes;
   a database storing the future transmit times of the other nodes;
   a transmitter broadcasting the chosen transmit time;
   wherein the logic circuitry chooses the transmit time to utilize as part of the active duty cycle by choosing a future transmit time most utilized by the other nodes;
   wherein the logic circuitry chooses the transmit time to utilize as part of the active duty cycle by grouping the future transmit times into bins of future transmit times, mathematically weighting each bin, and choosing the transmit time to utilize as part of the active duty cycle based on a weighted probability of each bin.

6. The method of claim 5 wherein the transmit time to utilize as part of the active duty cycle comprises a time slot to utilize as part of the active duty cycle.

* * * * *